United States Patent
Moldovyan et al.

(10) Patent No.: US 7,142,673 B1
(45) Date of Patent: Nov. 28, 2006

(54) METHOD FOR THE CRYPTOGRAPHIC CONVERSION OF L-BIT INPUT BLOCKS OF DIGITAL DATA INTO L-BIT OUTPUT BLOCKS

(75) Inventors: Alexandr Andreevich Moldovyan, Vsevolozhsk (RU); Nikolay Andreevich Moldovyan, Vsevolozhsk (RU)

(73) Assignee: Otkrytoye aktsionernoye obschestvo "Moskovskaya Gorodskaya Telefonnaya Set", Moscow (RU)

( * ) Notice: Subject to any disclaimer, the term of this patent is extended or adjusted under 35 U.S.C. 154(b) by 0 days.

(21) Appl. No.: 09/554,107

(22) PCT Filed: Nov. 28, 1997

(86) PCT No.: PCT/RU97/00394

§ 371 (c)(1),
(2), (4) Date: May 25, 2000

(87) PCT Pub. No.: WO99/00930

PCT Pub. Date: Jan. 7, 1999

(51) Int. Cl.
*H04K 1/06* (2006.01)
*H04L 9/00* (2006.01)
*H04L 9/18* (2006.01)

(52) U.S. Cl. .............................. 380/37; 380/28; 380/29

(58) Field of Classification Search ................ 380/280, 380/29, 37, 28
See application file for complete search history.

(56) References Cited

U.S. PATENT DOCUMENTS

| | | | |
|---|---|---|---|
| 5,142,578 A * | 8/1992 | Matyas et al. | 380/280 |
| 5,442,705 A * | 8/1995 | Miyano | 380/29 |
| 5,511,123 A * | 4/1996 | Adams | 380/29 |
| 5,778,074 A * | 7/1998 | Garcken et al. | 380/37 |
| 6,031,911 A * | 2/2000 | Adams et al. | 380/29 |
| 6,298,136 B1 * | 10/2001 | Den Boer | 380/29 |
| 6,301,362 B1 * | 10/2001 | Matyas et al. | 380/37 |
| 6,937,727 B1 * | 8/2005 | Yup et al. | 380/37 |

FOREIGN PATENT DOCUMENTS

DE    3905667    8/1990

(Continued)

OTHER PUBLICATIONS

Lai et al, "Hash Functions Based on Block Ciphers", Signal and Information Processing Lab., pp. 55-70, 1992.

(Continued)

*Primary Examiner*—Ayaz Sheikh
*Assistant Examiner*—Kaveh Abrishamkar
(74) *Attorney, Agent, or Firm*—Jacobson Holman PLLC

(57) ABSTRACT

The present invention relates to the field of electric communication and computer engineering, and more particularly, to the field of cryptographic methods and devices for ciphering digital data. The method comprises dividing a block of data $N \geq 2$ subblocks; converting these subblocks one after another by generating at least one binary vector according to the subblocks value and modifying the subblock using the binary vector. Novelty of the claimed method is in generating the binary vector at the subsequent step of sub-block conversion depending on the binary vector structure at the preceding step of subblock conversion. Novelty is also in generating two binary vectors and converting one of them by operation of cyclic shift on a number of bits equal to the value of the second binary vector. Further, novelty is in modifying one of the subblocks by applying to it a cyclic shifting operation on a number of bits equal to the current value of the binary vector. Novelty is also in the use, in subblock conversion, a number $T \geq 2$ of stuffing tables, whereby the number (v) of the table is calculated on the basis of the binary vector, and the subblock is modified by a stuffing operation determined by the v-th table.

4 Claims, 3 Drawing Sheets

FOREIGN PATENT DOCUMENTS

| | | |
|---|---|---|
| DE | 4016203 | 11/1991 |
| FR | 2222809 | 10/1974 |
| RU | 2024209 | 11/1994 |
| RU | 2032990 | 10/1995 |

OTHER PUBLICATIONS

Rivest, "The RC5 Encryption Algorithm", MIT Laboratory for Computer Science, pp. 86-96.

Schneier, Applied Cryptography Second Edition, Chapter 14, "Still Other Block Ciphers", pp. 342-344, 1966.

Data Encryption Standard (DES), Federal Information Processing Standards Publication 46-2, 16 pgs., Dec. 30, 1993.

Kaliski, Jr. et al, Lecture Notes in Computer Science, vol. 809 "Fast Block Cipher Proposal", pp. 33-39, 1994.

Biham et al, Differential Cryptanalysis of DES-like Cyptosystems, The Weizmann Institute . . . , pp. 1-105, Jul. 19, 1990.

* cited by examiner

METHOD FOR THE CRYPTOGRAPHIC CONVERSION OF L-BIT INPUT BLOCKS OF DIGITAL DATA INTO L-BIT OUTPUT BLOCKS

TECHNICAL FIELD

The invention relates to the field of electric communication and computer engineering, and in particular to the field of cryptographic methods and devices for ciphering messages (information).

PRIOR ART

Used in the description of the claimed method, as taken in the totality of its features, are the following terms:

secret key is binary information that is known only to the authorised user;

cryptographic conversion is conversion of digital information which ensures the influence of one bit of source data on multiple bits of output data, for example, with the purpose of protecting the information from unauthorised reading, forming a digital subscription, generating a modification detection code; some of important types of cryptographic conversions are unilateral conversion, hashing and ciphering;

information hashing is a certain method of generating the so-called hash code the size of which is typically fixed (usually 128 bits) for any size of messages; hashing methods are widely used based on iterative hash functions using block mechanisms of cryptopgrahic information conversion (see Lai X., Massey J. L. Hash Functions Based on Block Ciphers/Workshop on the Theory and Applications of Cryptographic Techniques, EUROCRYPT'92, Hungary, May 24–28, 1992, Proceedings, p.53–66);

ciphering is the process of information conversion which depends on the secret key and transforms the source text into a ciphered text represented by a pseudorandom sequence of characters such that it practically impossible to derive any information therefrom without being acquainted with the secret key;

deciphering or decryption is the process reverse of ciphering procedure; deciphering provides recovering the information according to the cryptogram provided that the operator is aware of the secret key;

cipher is a combination of elementary steps of converting input data using the secret key; the cipher may be implemented in the form of a computer program or as a separate device;

binary vector is a certain sequence of on- and off-bits, for example 101101011; a specific structure of the binary vector may be interpreted as a binary number if the position of each bit is considered to correspond to a binary order, i.e. the binary vector may be compared to a numeric value which is uniquely determined by the binary vector structure;

cryptanalysis is the technique of calculating the secret key for obtaining an unauthorised access to encrypted information or the elaboration of a method providing access to the encrypted information without having to calculate the secret key;

unilateral conversion is such a conversion of L-bit input block of data into an L-bit output block of data which allows to easily calculate the output block according to the input block, while calculating the input block which would convert into a randomly selected output block, is in fact an impracticable task;

unilateral function is a function the value of which is easily calculated according to the given argument, however calculating the argument according to the given function value is a computationally difficult problem; unilateral functions are implemented as a procedural sequence of unilateral conversion of certain input block (argument) whose output value is taken for the function value.

cryptographic resistance is constitutes the measure of reliability of ciphered information protection and represents the labour intensity measured as the number of elementary operations to be performed in order to recover the information according to the cryptogram in conditions where the operator is acquainted with the conversion algorithm and not with the secret key; in the case of unilateral conversions, by cryptographic resistance is meant the complexity of calculating of the block input value according to its output value;

cyclic shift operations dependent on subblocks being converted or dependent on the binary vector are cyclic shift operations on a number of bits determined by the subblock value or by the binary vector value; cyclic shift operation to the left (to the right) are designated with the sign "<<<" (">>>"), for example, the notation $B_1 <<< B_2$ signifies the cyclic shift operation to the left of the $B_1$ subblock on the number of bits equal to the value of the binary vector $B_2$; such operation are basic for RC5 cipher (R.Rivest, The RC5 Encryption Algorithm/Fast Software Encryption, Second International Workshop Proceeding (Leuven, Belguim, Dec. 14–16, 1994), Lecture Notes in Computer Science, v.1008, Springer-Veriag, 1955, pp.86–96);

single-site operation is an operation executed on a single operand (a data block or binary vector); the subblock value after performing certain give single-site operation depends only on its initial value; an example of single-site operations are cyclic shift operations;

dual-site operation is an operation executed on two operands; the result of performing certain given dual-site operation depends on the value of each operand; an example of dual-site operations are operations of addition, subtraction, multiplication, etc.

Methods are known for block encryption of data, see, e.g. US Standard DES (National Bureau of Standards. Data Encryption Standard. Federal Information Processing Standards Publication 46, January 1977). In this method, data block encryption is carried out by forming a secret key, subdividing the converted data block into two subblocks, I and R, and alternately modifying the latter by means of performing operation of bit for bit modulo 2 summation on the subblock L and a binary vector which are generated as the output value of certain function F according to the value of subblock R. After this, the blocks are permuted. Function F in the above method is implemented by performing permutation and stuffing operations executed on the subblock R. This method ensures a high conversion rate when implemented in the form of a specialised electronic circuitry.

However, the known prior art method utilised the utilised the secret key of a small size (56 bits) which makes it vulnerable to cryptanalysis on the basis of key selection. The latter is due to high computational throughput of modern mass use computers.

The closest prior art to the claimed method for cryptographic conversion of L-bit input blocks of digital data into L-bit output blocks is a method described in the work (Kaliski B. S., Robshaw M. J. B., Fast Block Cipher Proposal/Fast Software Encryption, Proceedings of the Cambridge Security Workshop, Lecture Notes in Computer Science, v.809, Springer-Verlag, 1994, pp.26–39; see also B. Schneier, "Applied Cryptography", Second Edition, John Wiley & Sons, Inc., New York, 1966, pp.342–344). The closest prior art method comprises generating a secret key, subdividing an input 1024-byte data block into 32-bit subblocks $B_0, B_1, B_2, \ldots, B_{265}$ and alternate converting. The secret key is generated as a table of permutation and ordered sequence of 2048 subkeys $Q_0, Q_1, Q_2, \ldots, Q_{2047}$, each of which is 32 bits long. Data block encryption is performed as four conversion rounds. One conversion round consists in the following. In accordance with the permutation table driven by the secret key, permutation of data subblocks is performed. Then all subblocks are converted alternately. A subblock, for example subblock $B_1$, is transformed as follows. A 32-bit binary vector V is generated according to the subblock values $B_h, B_k, B_j$, wherein h, i, j, k are different numbers according to the analytical expression $V=B_h+F(B_h, B_k, B_j)+Q_q$, where the "+" sign designates the modulo $2^{32}$ summing operation, and q is the number of the current subkey. The numbers h, i, j, k are selected depending on the number of the ciphering round and the number of the subblock conversion step. The generated binary vector is used in converting the subblock $B_1$ as follows. A modulo 2 bit-for-bit summation operation is performed on the subblock $B_1$ and V, and the value obtained after completion of this operation is assigned to subblock $B_1$. This is recorded as the relation $B_1 \leftarrow B_1 \oplus V$, where the sign "$\leftarrow$" signifies the assignment operation and the sign "$\oplus$" signifies the modulo 2 bit-for-bit summation operation. Subsequently, in a similar way, conversion of another subblock is carried out, etc., until all subblocks are converted. Each new step of forming the 32-bit binary vector is performed independently of the value of the binary vector which has been generated at the previous step. In one encryption round, the index i assumes, in a certain order of priority, 256 different values corresponding to all subblock numbers (from 0 to 255).

This method provides high cryptographic resistance due to a great length of data block and the use of a great number of conversion operations performed which fall on one subblock.

However the closest prior art has some disadvantages, namely, when implemented in software, it fails to provide high rate of cryptographic data conversion required for building software systems of computer information protection which would operate in the real time. For example, for microprocessor Pentium/200 the encryption rate does not exceeds 6 Mbit/s. This disadvantage is due to the fact that in order to ensure resistance to differential cryptanalysis, it is necessary to carry out a great number of conversion operations falling on a single bit of input data.

The basis of the present invention lies in the task of developing a method of cryptographic conversion of L-bit input blocks of digital data into L-bit output blocks, wherein input data conversion would be effected in such a manner as to reduce the number of conversion operations which fall on a single bit of the input data, with simultaneous provision of high resistance to differential cryptanalysis due to which the encryption rate is increased.

DISCLOSURE OF THE INVENTION

This task is achieved due to the fact that in the method of cryptographic conversion of L-bit input blocks of digital data into L-bit output blocks consisting in subdividing a data block into $N \geq 2$ subblocks, alternate subblock conversion by generating at least one binary vector according to the subblock value and modifying the subblock using the binary vector, the new feature, according to the invention, is that the binary vector is generated at the subsequent subblock conversion step depending on the binary vector structure at the preceding step of subblock conversion.

With such solution, better dissipation of the influence of bits of input data block on output block bits is ensured, due to which high resistance to differential cryptanalysis is provided with simultaneous reduction in the number of conversion operations being performed which ensures the increase in the rate of cryptographic conversion. Better dissipation is provided due to the fact that bits of subblocks transformed at preceding conversion steps affect the process of converting the current block in two ways: (1) directly influencing the current binary vector value, and (2) influencing the current binary vector value through the binary vector value at the preceding conversion steps.

A novel feature is also that two binary vectors are generated and one of them is converted using a cyclic shift operation on a number of bits equal to the second binary vector value.

Such solution allows to additionally enhance cryptographic resistance to converting information blocks with the length of L=512, 1024, 2048, 4096 and 8192 bits since such type of cyclic shift operations in non-linear and defines a more complex function of binary vector generation.

A novel feature is also the fact that modifying one of subblocks is performed by applying to it a cyclic shift operation on a number of bits that is equal to the current binary vector value.

With such solution, it is possible to ensure additional enhancement of cryptographic resistance of the conversion since cyclic shift operations of such type are non-linear and are performed directly on the subblocks being converted.

A novel feature is also that in subblock conversion, stuffing tables are utilised the number of which is $T \geq 2$, whereby the table number (v) is calculated according to the binary vector and the subblock is modified using a stuffing operation given by the v-th table.

Due to such solution, additional enhancement of cryptographic resistance of converting information blocks with the length of L=64 and 128 bits is provided since stuffing operations are non-linear and are effective in implementing when the size of the information block being transformed is comparatively small. The use of not predetermined stuffing operations is a method of achieving high cryptographic resistance to the strongest cryptanalysis methods, in particular, to differential cryptanalysis as described, e.g., in the work (Biham E., Shamir A., Differential Cryptanalysis of DES-like Cryptosystems/Journal of Cryptology, V.4, n.1, 1991, pp.3–72).

The essence of the present invention is explained below in more detail by way of some its embodiments made with references to the attached drawings.

PREFERRED EMBODIMENTS OF THE INVENTION

Figure 1:
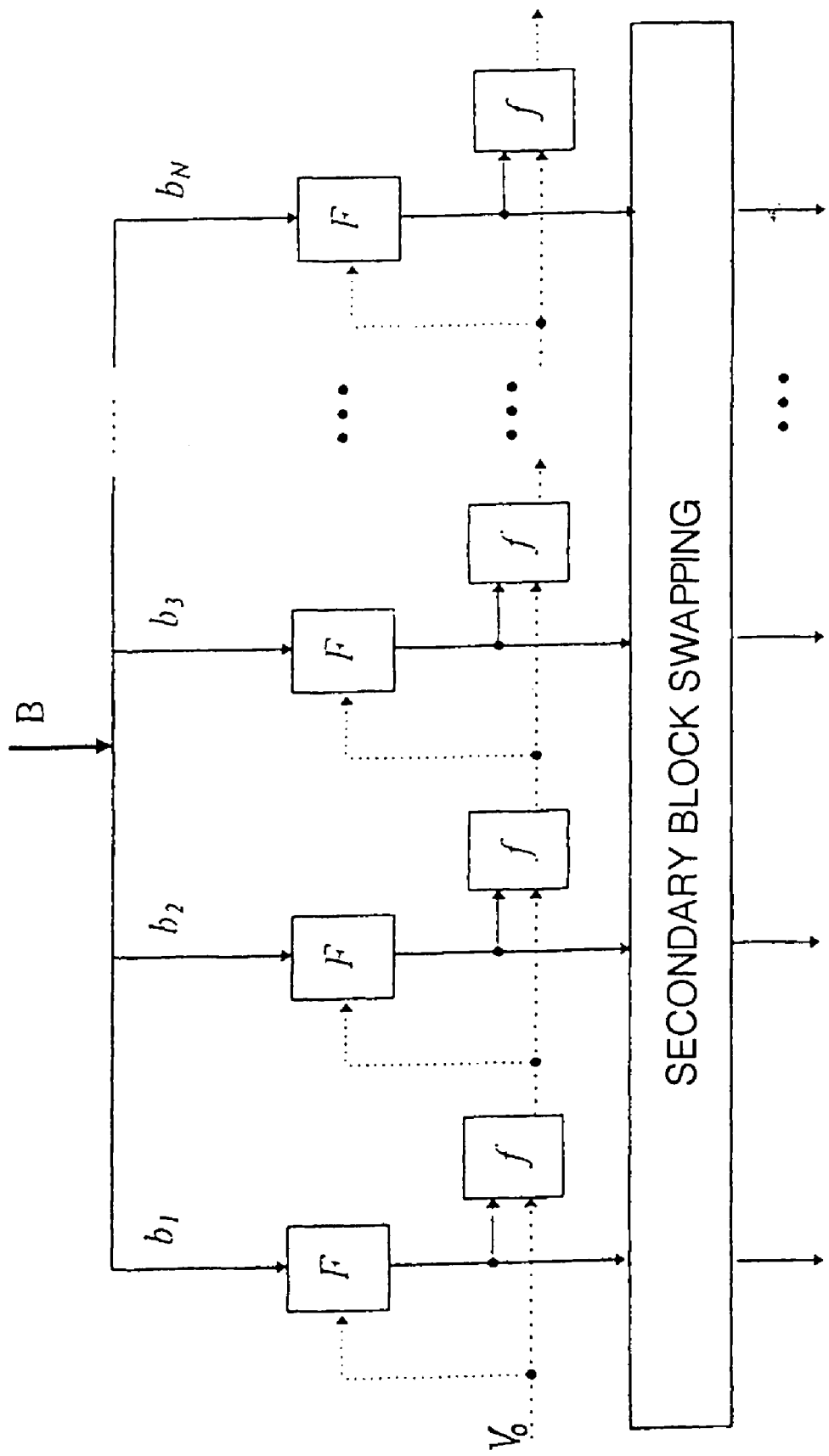
FIG. 1 is a generalised diagram of cryptographic conversion according to the claimed method.

The invention is explained with the aid of a generalised diagram of data block cryptographic conversion on the basis of the claimed method presented in FIG. 1, wherein: B is the block being converted, $b_1, b_2, \ldots, b_n$ are subblocks being converted, F is an operating block effecting subblock modification, f is an operating block effecting binary vector generation, $V_0$ is in the initial value of the binary vector. The input L-bit digital data block, where L is the number of binary digits in the block, is subdivided into $N \geq 2$ subblocks each of which has the size of L/N bits. The solid line corresponds to the transfer of subblocks being converted, the dotted line corresponds to transfer of the binary vector.

Subblocks are alternately transformed by being modified using the operating block F which is utilised in binary vector value conversions which conditions dependency of the output value of the subblock being converted on the binary vector value. The operating block f for converting the binary vector uses the value of subblock which has been converted at the preceding step, i.e. the operating block generates a binary vector according to the structure of one of the subblocks being converted and according to the binary vector value that it had at the precious subblock conversion step using the binary vector. This conditions dependency of binary vector value on the data being converted. We will call performing conversion procedures defined by function F on a subblock a step of binary vector generation. A step of subblock conversion includes a step of binary vector generation and a step of subblock modification. Conversion steps are executed sequentially on all subblocks followed by subblock permutation.

In particular cases of implementing the claimed method, subblock permutaiton may not be used. Performing N steps of subblock modification, N steps of binary vector generation and subblock permutation shown in FIG. 1 constitutes one round of the conversion. The binary vector value after the N-th step of binary vector generation serves as a binary vector initial value for the next round of the conversion in constructing unilateral functions of L-bit digital data block conversion. In constructing ciphers, the binary vector initial value for each round is generated depending on the secret key. The number of conversion rounds may be defined depending on specific versions of forming the operating blocks F and f. What is important in the above diagram, the binary vector is generated depending on its structure at the preceding step of subblock conversion using the binary vector.

By subblock conversion using the binary vector we mean (1) executing a dual-site operation operands of which are a subblock and a binary vector, or (2) executing a single-site operation on a subblock (for example, bit stuffing or permutation), modification of which is selected depending on the binary vector value, or (3) executing a dual-site operation performed on a subblock and a subkey whose number depends on the binary vector value. For example, in the first case this may be conversion of 32-bit subblock B when this subblock is assigned the value equal to the result of modulo $2^{32}$ addition of subblock B and binary vector V: $B \leftarrow B+V$. In the second case, this may be a cyclic left shift operation performed on subblock B on a number of orders equal to the binary vector value analytically expressed with the relation $B \leftarrow B <<< V$. In the third case, this may be e.g., conversion set by the expression $B \leftarrow B \oplus Q_v$, where $Q_v$ is a subkey with the number v calculated by the binary vector value: $v = V$ mod $2^{11}$. The last relation defines selection of the number equal to the value of 11 lowest-order digits of the binary vector.

An important special case of the second version of the binary vector use in subblock conversions is performing a binary vector-dependent stuffing operation on a subblock. Such type of stuffing may be used in defining a plurality of different stuffing tables each of which being assigned an ordinal number, and to perform the stuffing operation on the subblock the table is used, the number of which is selected depending on the value V, e.g., when 32 stuffing tables are used, the table number may be calculated by formula $v = V$ mod $2^5$. The meaning of selecting the stuffing table which is used for performing the stuffing operation on the subblock at the current step according to a specially generated binary vector consists in making stuffing table selection indefinite for each subblock conversion step which enhances resistance of cryptographic conversion.

By binary vector generation we mean a record of a certain sequence of on- or off-bits made, for example, to a register or a computer memory cell. By binary vector generation depending on its structure at the preceding subblock conversion step using the binary vector we mean specifying dependency of the current value of the binary vector being generated on the value which the binary vector had at the preceding step, in use, in data subblock conversion. For example, let us assume that the subblock $B_i$ has been converted using the binary vector value V. Prior to the use of the binary vector at any other conversion step, e.g., of subblock $B_j$, the binary vector may be generated in accordance with the expression $V \leftarrow V+Q_b$, where $b = B_i$ mod $2^{11}$, the number of subkey calculated depending on the subblock $B_i$ value.

The possibility of technical implementation of the claimed method is explained with the following specific examples of its embodiment.

EXAMPLE 1

This example is a version of the claimed method executing ciphering of data blocks with 512 bytes (4096 bits). Use of such size of input blocks is conditioned by the fact that this block size is standard in computer systems. When using block ciphers which process blocks of such size, the possibility remains of arbitrary access to data stored on the inbuilt magnetic carrier in an encrypted form. In this example, a 8192-byte secret key is used represented in the form of totality of 2048 numbered 32-bit subkeys $\{Q_v\}$, where v=0, 1, 2, . . . , 2047. The secret key is formed, for example, by copying it from the magnetic carrier to the computer working memory. Cryptographic conversion according to Example 1 is described with the following algorithm.

Algorithm 1: Ciphering of 4096-bit blocks.

INPUT: 4096-bit block represented as a totality of 128 32-bit subblocks $\{B_1, B_2, \ldots, B_{128}\}$.

1. Set the number of the block being processed i=1 and initial values of binary vectors $V_1$, $V_2$, $V_3$, and v: $V_1 \leftarrow Q1$; $V_2 \leftarrow Q_2$; $V_3 \leftarrow Q_3$; $v \leftarrow 79$.

2. Generate binary vector v according to the structure of the binary vector $V_1$: $v \leftarrow v \oplus (V_1 \bmod 2^{11})$, where "$\oplus$" is modulo 2 summation operation.

3. Generate binary vector $V_2$: $V_2 \leftarrow [(V_2+Q_v) \oplus V_1] >>> 11$, where "+" is modulo $2^{32}$ summation operation.

4. Generate binary vector v according to the structure of the binary vector $V_2$: $v \leftarrow v \oplus (V_2 \bmod 2^{11})$.

5. Generate binary vector $V_3$: $V_3\{[V_3 >>> V_2] \oplus Q_v] - V_1\} >>> 22$, where "−" designates modulo $2^{32}$ subtraction operation.

6. Generate binary vector v according to the structure of the binary vector $V_3$: $v \leftarrow v \oplus (V_3 \bmod 2^{11})$.

7. Generate binary vector $V_1$: $V_1 \leftarrow V_1+Q_v$.

8. Convert subblock $B_1$: $B_1 \leftarrow [(B_1 <<< V_2) \oplus V_3]+V_1$.

9. Generate binary vector $V_1$: $V_1 \leftarrow B1$.

10. Convert subblock $B_1$: $B_1 \leftarrow B_1+V_2$.

11. If i≠128, modify the value of number i: i←i+1 and go to step 2.

12. Permute subblocks in reverse order.

OUTPUT: 4096-bit cipher text block in the form of totality of converted subblocks {$B_1, B_2, \ldots, B_{128}$}.

Algorithm 1 describes on ciphering round. After the first round, a second ciphering round is performed taking the output block of the first round as an input block for the second round. Then a third (last) ciphering round is performed taking the output block of the second round as an input block for the third round. When implemented in software, the encryption rate using the three conversion rounds is about 30 Mbit/s for microprocessor Pentium/200.

EXAMPLE 2

Let us consider an embodiment of the claimed method using stuffing operations defined by stuffing tables. Let the stuffing operations be executed on digital data subblocks having a length of k bits, where k is an integer. Then in order to define the stuffing operation transforming a k-bit subblock into a k-bit output subblock, it will be necessary to use a table containing two number lines:

0 1 2 ... N-1

$a_0\ a_1\ a_2\ \ldots\ a_{N-1}$, where $N=2^k$.

The given table contains, in its bottom line, all possible values of the k-bit block evenly by one time but in an arbitrary order. The proper sequence of number position in the bottom line defines a specific version of the stuffing table and, consequently, also a specific version of the stuffing operation performed using this table. Performing the stuffing operation is as follows. A number is selected in the top line that is equal to the input block value. The value in the bottom line located under this number is selected as an output block. Thus, the stuffing table may be located in a computer working memory as a sequential notation of k-bit computer words located in cells with the addresses $w_0, w_1, w_2, \ldots, w_{N-1}$. In this case, the value of the input block b serves for calculating the address of word $w_0+b$ which is taken as an output block. This method of representing the stuffing table requires the use of memory size equal to kN bits.

Let us select the number of stuffing tables equal to $2^L$ (the size of the requires memory in this case will be $2^L kN$ bits) and arrange the stuffing tables uninterruptedly one after another. Let us take as an address of the table with the number v the address value $w_0$ of its first k-bit word. Let the table number with the number 0 is s. In this case, the stuffing table address with an arbitrary number v is s+vN. If a binary vector is defined that determines the number of the current stuffing table, v, and the current input subblock for performing the stuffing operation, then it is executed by replacing the current input block by a k-bit word located at the address s+vN+b, where b is the value of subblock on which the current stuffing operation is performed. Using this relation, it is easy to define selection of the stuffing table having the number v and perform stuffing on the subblock with the value b. In the case considered, setting dependency of the stuffing tables on the binary vector value and performing the stuffing operation are effected by microprocessor very rapidly when appropriate values of parameters L and k are selected, for example, when L=5 and k=8. With these parameters, in order to located the stuffing tables, 8 Kbytes of the working memory are required which is acceptable since modern computers have the size of the working memory many orders larger than this value (from 1 to 64 Mbytes and more).

Let L=5 and k=8, i.e. there are 32 tables defining the stuffing operations on 8-bit data subblocks. Let us form a secret key represented as a totality of 7R 8-bit subkeys $k_{11}, k_{12}, \ldots, k_{17}$ (first subkey line)

$k_{21}, k_{22}, \ldots, k_{27}$ (second subkey line)

...

$k_{r1}, k_{r2}, \ldots, k_{r7}$ (r-th subkey line)

...

$k_{R1}, k_{R2}, \ldots, k_{R7}$ (R-th subkey line), where R is the number of ciphering rounds. During the r-th ciphering round, the r-th subkey line is used.

Let us designate the stuffing tables employed as follows: $T_0, T_1, T_2, \ldots, T_{31}$, and the stuffing operation defined by table $T_v$ as $S_v$, where v=0, 1, 2, ..., 31. The stuffing tables $T_0, T_1, T_2, \ldots, T_{15}$ may be selected as arbitrary, while tables $T_{16}, T_{17}, \ldots, T_{31}$ are taken such that the stuffing operations $S_v$ and $S_{31-v}$ are mutually converse. The last condition is met when the pairs of tables $T_{16}$ and $T_{15}$; $T_{17}$ and $T_{14}$; $T_{18}$; and $T_{13}, \ldots, T_{31}$ and $T_o$ will give mutually converse stuffing operations. For a set of arbitrary stuffing tables $T_0, T_1, T_2, \ldots, T_{15}$, is easy to construct tables corresponding to converse stuffing operations. For example, for the stuffing operation set by the following table 0 1 2 ... 255

$a_o\ a_1\ a_2\ \ldots\ a_{255}$, while the converse stuffing is set by the table 0 1 2 ... 255

$z_0\ z_1\ z_2\ \ldots\ z_{255}$, where the line ($z_0, z_1, z_2, \ldots, z_{255}$) turns out to be the top line after the columns of the preceding tables have been ordered in the order of increasing numbers in the bottom line.

Figure 2:
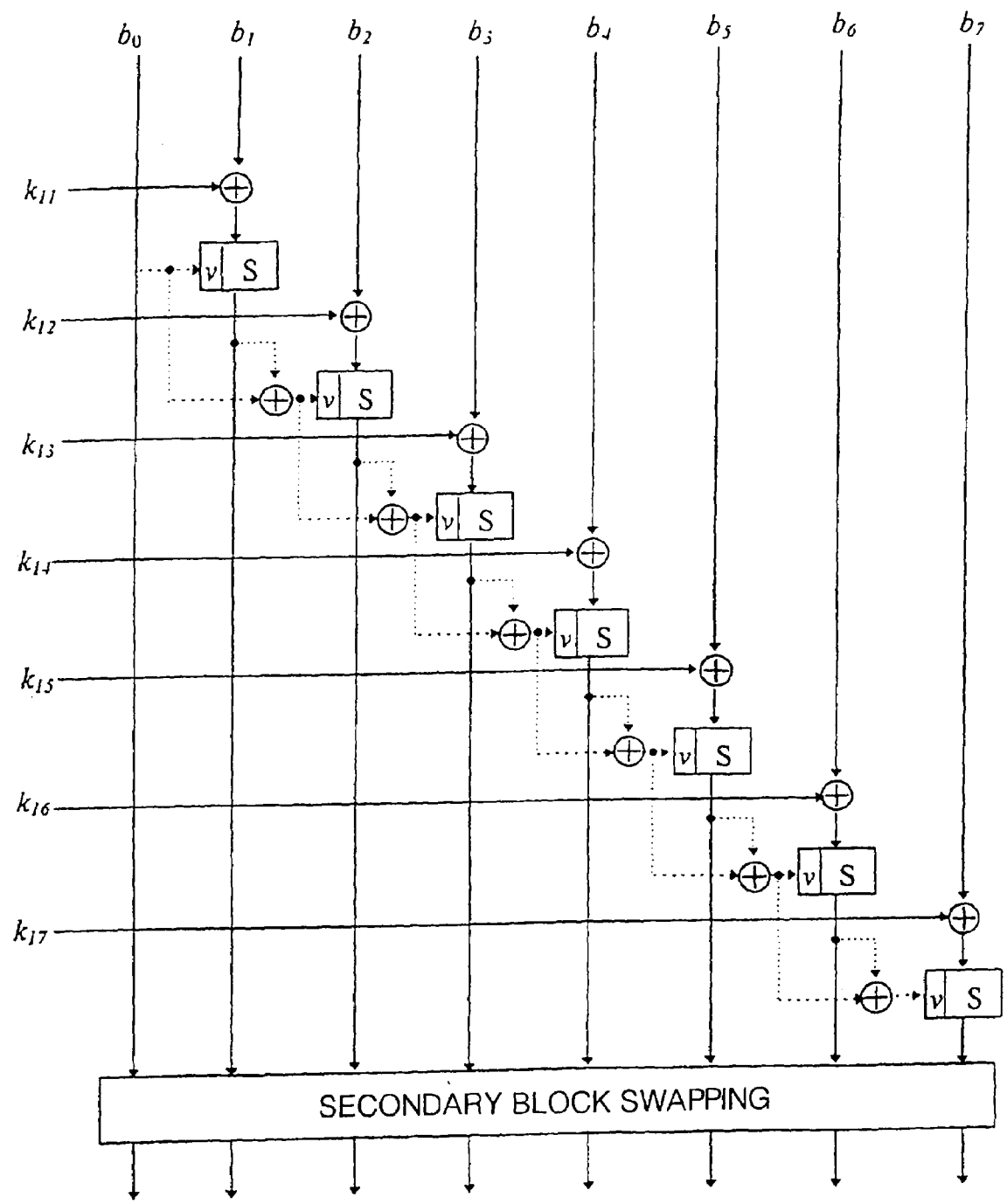
FIG. 2 is encryption scheme corresponding to Example 2.
Figure 3:
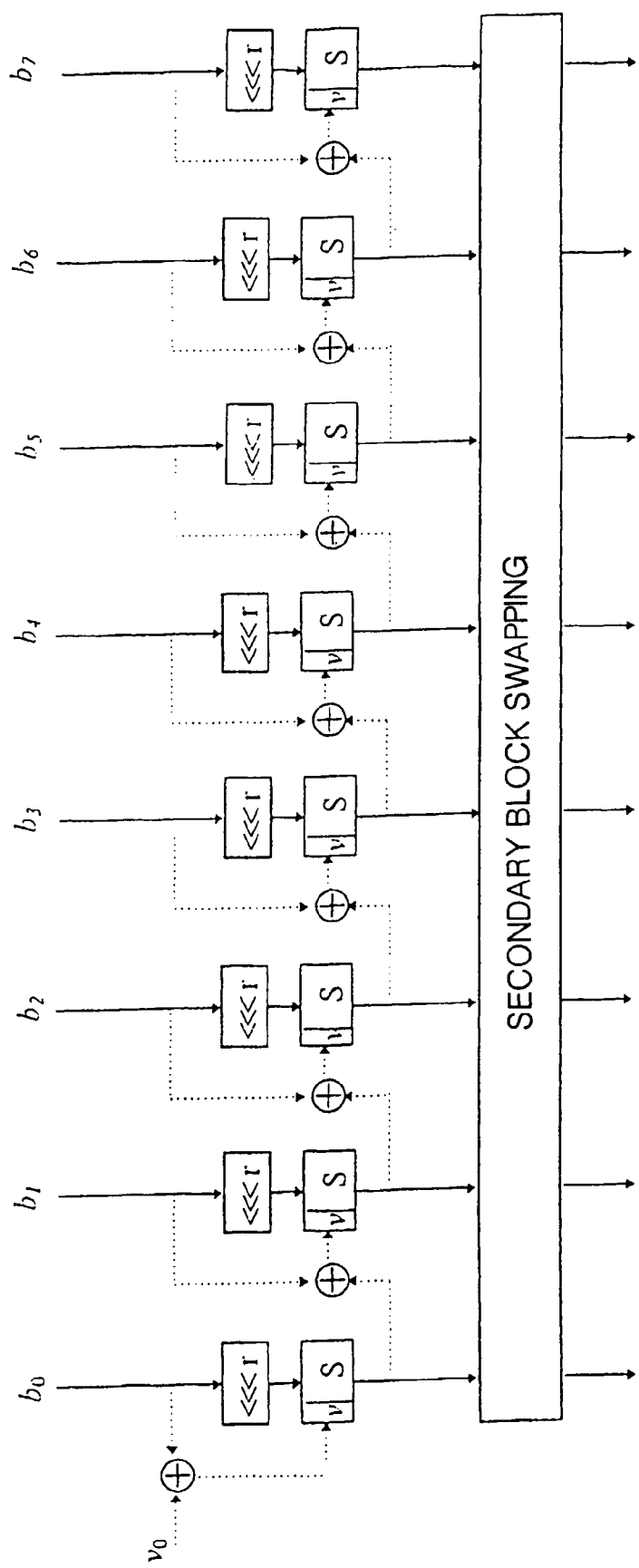
FIG. 3 is unilateral conversion scheme corresponding to Example 3.

FIG. 2 shows the diagram of the first ciphering round. In FIG. 2. the solid vertical line corresponds to transmitting 8-bit data subblocks, the dotted line corresponds to transmitting 5 bit subblocks, the horizontal solid line corresponds to transmitting 8-bit subkey. Operation of bit-for-bit modulo 2 summation is designated by the sign "⊕", v designates the number of selected stuffing table, block S designates stuffing operation, $k_{11}, k_{12}, \ldots, k_{17}$ are subkeys used during the first round. Arrows on the lines signify the direction of signal transmission. Example 2 corresponds to digital data block encryption with the size of 64 bits. The ciphering is performed as follows. An input block is subdivided into 8 subblocks, $b_0, b_1, b_2, \ldots, b_7$, each of 8-bit size. After that, a binary vector v is generated having the value of 5 low-order subblock $b_0$ bits: $v \leftarrow b_o \bmod 2^5$. Then modulo 2 bit-for-bit summation operation is performed on subblock $b_1$ and subkey $k_{11}$ and the output value of this operation is assigned to block b1 which may be analytically written as follows: $b_1 \leftarrow b_1 \oplus r_{11}$. Then according to the stuffing table with number v the stuffing operation is carried out on subblock $b_1$: $b_1 \leftarrow S_v(b_1)$. Then according to the value $b_1$ a binary vector v is generated, v: $v \leftarrow v \oplus (b_1 \bmod 2^5)$, whereby the new value of binary vector depends on its previous value. Following this, conversion of subblock $b_2$ is performed: $b_2 \leftarrow b_2 \oplus k_{12}$ and then $b_2 \leftarrow S_v(b_2)$.

Similarly, conversion of subblocks $b_3$, $b_4$, $b_5$, $b_6$ and $b_7$ is carried out. During the last step of each ciphering round, subblocks are permuted in the reverse order, i.e. blocks $b_7$ and $b_0$, $b_6$ and $b_1$, $b_5$ and $b_2$, $b_4$ and $b_3$ are interchanged in pairs.

The second round is performed in the similar way, except that the second subkey line is used instead of first subkey line. Then the third ciphering round is carried out using the third subkey line, etc. All in all, R ciphering rounds are performed where R=4. When implemented in software, this embodiment of the claimed method provides the encryption rate of about 25 Mbit/s for microprocessor Pentium/200. If required, another number of the rounds may be set, for example, R=2, 3, 5, 6.

EXAMPLE 2

The Example is described by the following algorithm.
Algorithm 2.
Input. A 64-bit digital data input block represented as concatenation of 8-bit subblocks $b_0|b_1|b_2|b_3|b_4|b_5|b_6|b_7$ where the sign "|" signifies the concatenation operation.
1. Set the number of ciphering rounds R=4 and counter of rounds number r=1.
2. Set counter i=1.
3. Generate binary vector v: $v \leftarrow b_{i-1} \bmod 2^5$.
4. Convert subblock $b_i$: $b_i \leftarrow b_i \oplus k_{r,i}$, $b_i \leftarrow S_v(B_i)$, where the stuffing operation $S_v$ is performed using the stuffing table with the number v.
5. Generate binary vector v: $v \leftarrow v \oplus (b_i \bmod 2^5)$.
6. If $i \neq 7$, then increment $i \leftarrow i+1$ and move to step 4.
7. If $r \neq R$, then increment $r \leftarrow r+1$. Otherwise, STOP.
8. Permute subblocks in reverse order and move to step 3.
Output: 64-bit cipher text block.

In this Example, it is seen that the number of the stuffing table employed depends on the blocks being converted and is not predetermined for the current conversion step, i.e. the stuffing operation is not known in advance for all conversion steps. It is determined by a secret key and the block of data being converted. Deciphering is conducted similarly and is described by the following algorithm..
Algorithm 3.
Input: 64-bit input cipher text block $b_0|b_1|b_2|b_3|b_4|b_5|b_6|b_7$.
1. Set the number of ciphering rounds R=4 and counter of rounds number r=1.
2. Set counter i=1.
3. Generate binary vector v: $v \leftarrow b_{i-1} \bmod 2^5$.
4. Store the number of $b_i$ in variable g: $g \leftarrow b_i$. Convert subblock $b_i$: $b_i \leftarrow S_{31-v}(b_i)$, $b_i \leftarrow b_i \oplus k_{r',i}$, where r'=5−r.
5. Generate binary vector v: $v \leftarrow v \oplus (g \bmod 2^5)$.
6. If $i \neq 7$, then increment $i \leftarrow i+1$ and go to step 4.
7. If $r \neq R$, then increment $r \leftarrow r+1$. Otherwise, STOP.
8. Permute subblocks in reverse order and move to step 3.
Output: 64-bit block of original set.

The above ciphering and deciphering algorithms may be easily modified to convert data blocks of another size, e.g. 128 and 256 bits.

EXAMPLE 3

This Example relates to constructing a unilateral function based on the claimed method for cryptographic conversion.

As in Examples 1 and 2, it is assumed to use 32 stuffing tables $T_0$, $T_1$, $T_2$, ..., $T_{31}$. The stuffing tables are assumed to be known and no secret keys are used. The unilateral function is given by algorithm 4. The sequence of data subblocks conversion operations for a single round of conversion is shown in FIG. 2.
Algorithm 4.
Input. 64-bit input data block represented as a concatenation of 8-bit subblocks $b_0|b_1|b_2|$ ... $|b_7$.
1. Set the number of conversion rounds R=8, counter of rounds number r=1 and initial value of binary vector v=13.
2. Set counter i=1.
3. Generate binary vector v: $v \leftarrow v \oplus (b_{i-1} \bmod 2^5)$.
4. Convert subblock $b_{i-1}$: $b_{i-1} \leftarrow b_{i-1} <<< r$, $b_{i-1} \leftarrow S_v(b_{i-1})$.
5. If $\neq 8$, then increment $i \leftarrow i+1$ and move to step 3.
6. Permute subblocks $b_0$, $b_1$, ..., $b_7$ in reverse order.
7. If $r \neq R$, then increment $r \leftarrow +1$ and move to step 2. Otherwise, STOP.
Output: 64-bit value of function F.

In a similar way, it is possible to construct a unilateral function for converting 128-bit data block which may be used to hash the data.

The above examples show that the proposed method of digital data block cryptographic conversions is technically feasible and enables to solve the present problem.

INDUSTRIAL APPLICABILITY

The claimed method may be implemented, for example, on personal computers and provides the possibility of creating on its basis high-speed encryption software modules and of replacing of costly specialised encryption equipment with a personal computer provided with a software system of high-speed encryption.

The invention claimed is:

1. A method for cryptographic conversion of L-bit input blocks of digital data into L-bit output blocks, comprising the steps of subdividing a data block into N≧3 subblocks, then alternately converting each subblock by generating at least one binary vector that depends on the value of a preceding subblock and modifying a subsequent subblock by using said binary vector, wherein said binary vector being generated at the subblock conversion step also depends on the structure of a preceding binary vector inputted at a preceding step of subblock conversion for modifying said preceding subblock, when there is a preceding step of subblock conversion.

2. The method of according to claim 1, wherein two binary vectors are generated and one of them is converted by using a cyclic shift operation on a number of bits that is equal to the value of the other binary vector.

3. The method according to claim 1, wherein one of said subblocks is modified by applying to it a cyclic shift operation on a number of bits that is equal to the current value of the binary vector.

4. The method according to claim 1, wherein, the subblock conversion, stuffing tables are used and the number of which is T≧2, the table number (v) being calculated according to said binary vector and said subsequent subblock being modified by using the stuffing operation defined by said v-th table.

* * * * *